United States Patent Office 2,819,151
Patented Jan. 7, 1958

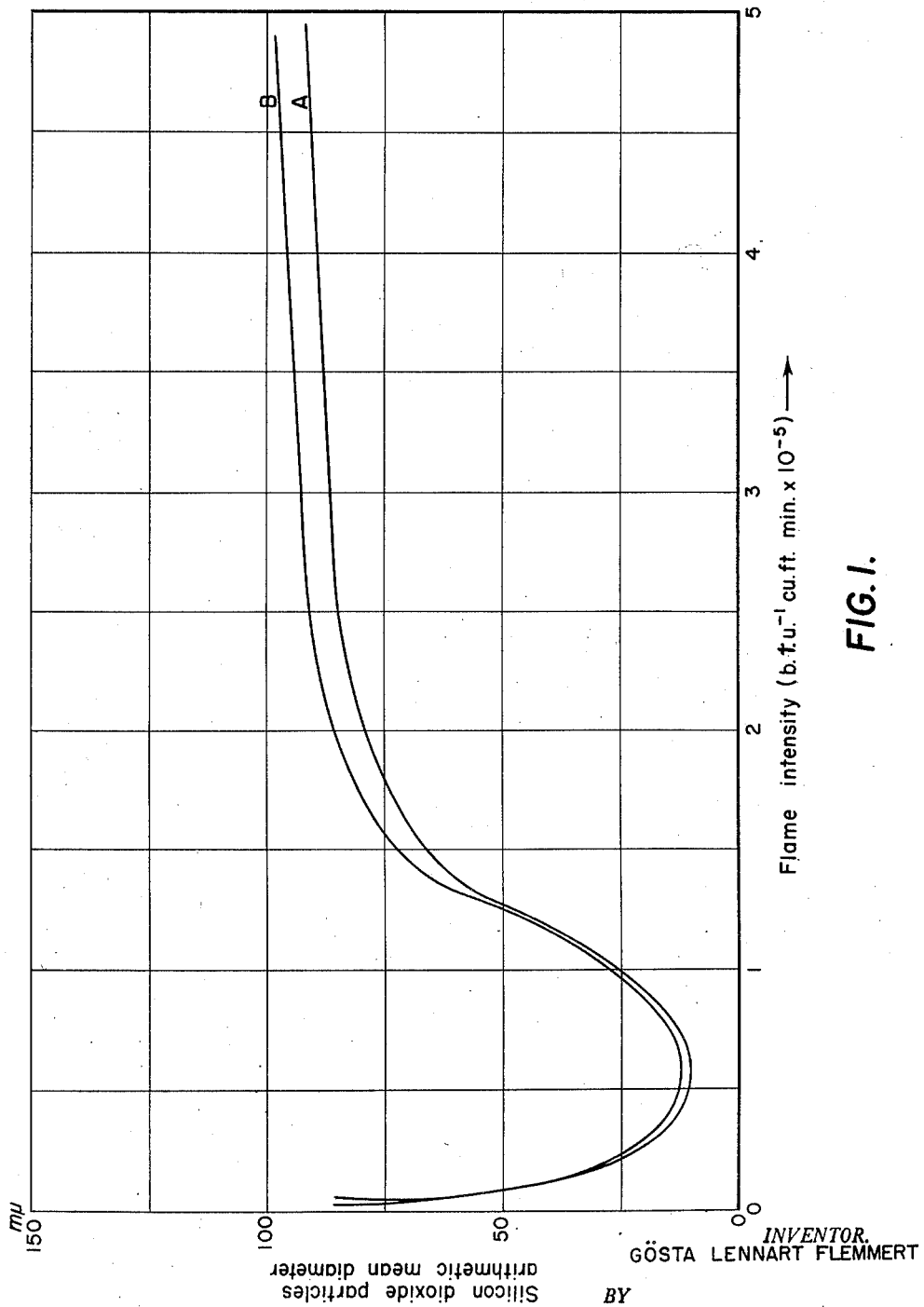

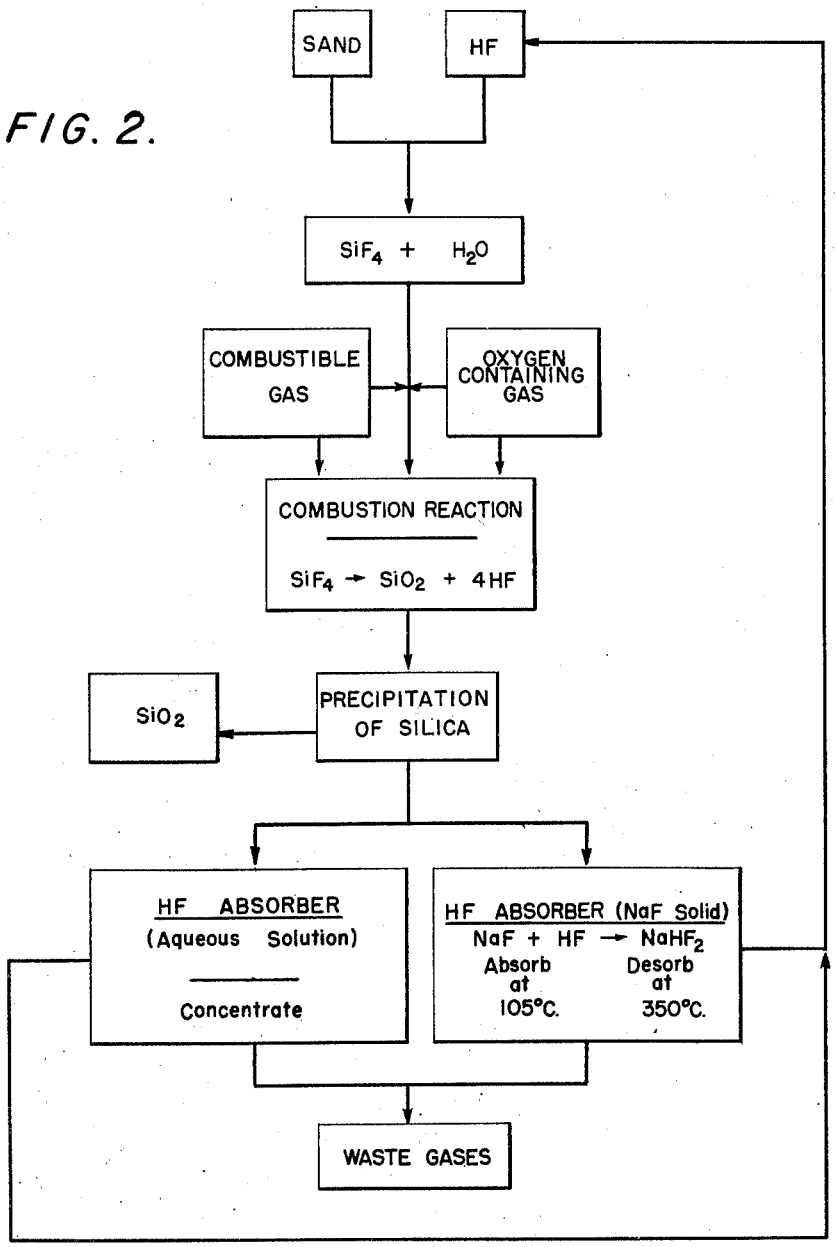

2,819,151

PROCESS FOR BURNING SILICON FLUORIDES TO FORM SILICA

Gösta Lennart Flemmert, Nynashamm, Sweden

Application June 17, 1954, Serial No. 437,383

Claims priority, application Sweden March 2, 1954

12 Claims. (Cl. 23—182)

This invention relates to a process for reacting silicon fluorides such as silicon tetrafluoride in the vapor phase with oxygen and a combustible gas to form silicon dioxide and hydrogen fluoride, especially adapted for making silicon dioxide in the form of amorphous finely-divided particles ranging from about 5 to about 50 m$\mu$ in mean diameter.

The combustion process previously employed to prepare silica of pigment grade involves burning volatile silicon compounds in air or oxygen in the flame of a combustible gas such as coal gas or water gas, oxygen being used to oxidize the silicon compound. This process is described in British Patents Nos. 258,313, dated September 15, 1926, and 438,782, dated November 22, 1935. Silica is formed according to the following reaction, in which silicon tetrafluoride and methane, a component of coal gas, are indicated as exemplary:

$$SiF_4 + CH_4 + 2O_2 \rightarrow SiO_2 + CO_2 + 4HF$$

This reaction does not present the difficulty in a vapor phase hydrolysis of achieving a sufficiently high reaction temperature, inasmuch as heat is supplied to the reaction mixture by the combustion, which is exothermic.

However, in this combustion reaction, it is difficult to control the particle size of the silica. In fact, if the burning is carried out under normal circumstances without more than an ordinary control of the flame intensity, the silica will be relatively dense and will have a mean particle size appreciably in excess of 100 m$\mu$, up to 400 m$\mu$ and more. The smallest mean particle size claimed in the British Patent No. 258,313 is 150 m$\mu$. This of course is too large for a satisfactory reinforcing agent for rubber. At the same time the yield is as low as 10–40% of theoretical. This means that the product obtained is unsatisfactory for the most important applications, such as use as a rubber filler and as a thickening agent in greases, paints and lacquers, and at the same time the price will be relatively high, because of the low yield.

In the Broughton Patent No. 2,535,036, dated December 25, 1950, there is described a method for the manufacture of silica in amorphous finely-divided form of so-called pigment grade involving a vapor phase hydrolysis in accordance with the following equation:

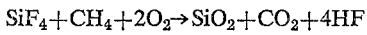

$$SiF_4 + 2H_2O \rightleftharpoons SiO_2 + 4HF$$

The vapor phase hydrolysis has certain advantages over the liquid phase hydrolysis, as the Broughton patent points out. However, the hydrolysis is an endothermic reaction and requires the introduction of heat to achieve conversion of the tetrafluoride to silica. Also, it is essential to bring the reactants at least to 450° C. to effect a good reaction.

The equilibrium constants for this reaction have long been known. Baur, Z. physik. Chem. 48, 483–503 (1904) reported experimental data on the equilibrium both at 104° and at 270° C. Equilibrium constants for the reaction were determined experimentally at several temperatures in the range from 200 to 800° C. by Lenfesty et al., Ind. Eng. Chem. 44, 1448–1450 (1952). It is apparent from Lenfesty et al.'s data that the reaction proceeds to the right in a significant way only at temperatures of 600° C. and above. Such temperatures are difficult to achieve with uniformity throughout the reaction mass.

In this patent, no suggestion appears that it is possible to control the particle size of the silica. As a matter of fact, it is difficult in this reaction, too, to control the particle size of the silica within reasonably narrow limits. It is desirable when the silica is to be used as a reinforcing agent in rubber compounding that the silica have a mean particle size of 50 m$\mu$ or less. A large proportion of the silica particles obtained in this vapor phase hydrolysis usually are as large as 400 m$\mu$, and the mean particle size usually is of the order of 100–200 m$\mu$.

In accordance with the instant invention, a silicon fluoride, a combustible gas and oxygen are reacted together in a flame, thereby forming silica and hydrogen fluoride. The flame intensity is increased beyond normal intensity so as to increase the temperature and decrease the conversion time. The flame intensity can be increased by various methods, which are described later, and the intensity is controlled within specified limits so as to yield silica in the form of spherical amorphous particles having an arithmetic mean diameter within the range from about 5 to about 50 m$\mu$.

The reaction probably proceeds in certain zones of the flame. The intensity of the flame in these reaction zones is of primary importance in determining the particle size of the silica, and for this reason can be regarded as equivalent to the intensity of the reaction. However, the flame intensity in the reaction zones is difficult to measure except in terms of the heat liberated by the reaction, which of course is directly proportional to the heat liberated by the flame, and therefore for the purposes of the invention, the intensity of the reaction is measured by the intensity of the flame itself.

The intensity of the flame can be measured in terms of the amount of heat liberated per unit volume and per unit time, i. e., $$\frac{B. t. u.}{Cu. ft. min.}$$

These quantities for the purposes of the invention are measured in British thermal units, abbreviated B. t. u., cubic feet and minutes. For convenience of representation, reciprocal B. t. u. units are used, i. e.,

$$\frac{1}{B. t. u.}$$

or B. t. u.$^{-1}$, and the terms "reciprocal B. t. u." and "B. t. u.$^{-1}$" will be understood to refer to the volume of the flame in cu. ft. for each B. t. u. evolved per minute in the flame.

Accordingly, in the process of the invention the flame intensity is maintained within the range from about 0.1 to about 1.3×10$^{-5}$ B. t. u.$^{-1}$. This range lies essentially below the intensity of a normal flame in which silicon fluorides are subjected to the reaction in accordance with the invention. These intensity limits are critical, inasmuch as at flame intensities both above and below these limits the silica particle size again increases.

Figure 1 shows the silica particle size obtained at various flame intensities; B. t. u.$^{-1}$ are plotted as the abscissa, and the arithmetic mean particle diameter in m$\mu$ of the silica obtained is plotted as the ordinate. Curve A represents the intensity obtained utilizing commercial propane gas, a mixture of hydrocarbons containing 3% CH$_4$, 10% C$_2$H$_6$, 61% C$_3$H$_8$ and 26% C$_4$H$_{10}$ as the combustible gas, and Curve B represents the flame intensity utilizing hydrogen. These curves are obtained by plotting the values set forth in Examples 1 to 7 infra.

It is not possible to explain why larger particle sizes are obtained when the flame intensity is both above and below the intensity indicated in the figure. The following theories are suggested, without any intent to be bound thereby.

It seems likely that when the intensity is lower than that utilized in the invention the reaction proceeds more slowly, so that growth of small particles to form larger particles has time to occur.

When the intensity is above that employed in the invention a part of the flame may be very hot, and a part rather cool, so that small particles which are condensed and remain in the cool parts grow larger and small particles condensed in the cool parts which happen to pass into the hot parts are volatilized.

The flame intensity and with it the reaction intensity can be controlled within the specified limits by several expedients. Many will occur to those skilled in the art, but the following are mentioned as preferable.

In the ordinary flame, the combustible gas and the gas containing the silicon fluoride are mixed in the flame zone with enough oxygen to support combustion. This technique can be used in the invention if one or more of the gases is preheated, or if the gases are mixed in the flame reaction zone with great turbulence. Otherwise, it is desirable to mix the silicon fluoride and the combustible gas together with a part or all of the oxygen-containing gas before introduction into the flame. The increase in intensity becomes quite marked when the preformed mixture contains 25% of an oxygen-containing gas.

The silicon fluoride, the combustible gas and the oxygen-containing gas can be mixed thoroughly in the flame zone, by utilizing fine jets and discharging the gases into the flame under pressure. If the jets are small and fixed to impinge on a common focus or foci the mixing will be quite thorough. A swirling motion may be imparted to the gas mixture to ensure better mixing.

It also may be convenient to mix the combustible gas and the silicon tetrafluoride and possibly some part of the oxygen-containing gas together and then discharge the mixture from a multiplicity of small jets into the flame zone. In this way small intense flames can be obtained at each jet.

The proportions of silicon fluoride to combustible gas influences the flame intensity in that a higher amount of silicon fluoride gives a lower flame intensity. Further, the amount of silicon tetrafluoride has a considerable influence on the yield of silicon dioxide in that the yield decreases with increasing amounts of silicon fluoride. Therefore it most often is suitable to use a considerable excess of the combustible gas, as is seen from the examples given below. With these factors in mind, however, the amount of silicon fluoride can be varied within wide limits. In the case of hydrogen as the combustible gas a good yield is obtained using less than approximately 0.5 gram of silicon tetrafluoride to each liter of hydrogen and when commercial propane gas is used the optimum is less than about 1.5 grams of silicon tetrafluoride per liter of gas; there is no lower limit except as dictated by economic reasons, because of a lowering in efficiency due to too small an amount of the fluoride to make the process practical for the amounts of gas burned.

The amount of oxygen or oxygen-containing gas also has a considerable influence on the flame intensity, in that an excess of oxygen (as compared with the theoretical amount) normally increases the intensity to a maximum, but beyond this point a further excess of oxygen-containing gas lowers the flame intensity, and renders the flame more unstable. The more intense the mixing of the gases introduced into the flame, the lower the excess of oxygen necessary in order to obtain the optimum flame intensity. In practice, an excess of 10 to 75% oxygen has proved to be preferable.

Introduction in the flame of diluting gases for instance nitrogen, hydrogen fluoride or water vapor, considerably decreases the flame intensity. Therefore, when inert gases are present in appreciable amounts in the flame it is necessary to provide a very intense mixing and possibly also to use preheated gases in order to obtain the flame intensity desired. If on the other hand the gases introduced in the flame are not diluted or are diluted only in part with inert gases, the flame intensity may exceed $0.1 \times 10^{-5}$ B. t. u.$^{-1}$ giving a mean particle size coarser than 50 m$\mu$.

As stated, it is possible to preheat one or more of the gases or the gas mixture before introduction into the flame zone. This alternative may be combined with any of the above procedures. The higher the temperature, the greater the effect of the preheating. However, when preheating gas mixtures containing both the silicon tetrafluoride and water vapor the temperature should be below that at which the gases will react to form silica; usually 400° C. is the threshold temperature for such a reaction.

The heat and intensity of the flame can be further increased by enclosing all or a part of the flame zone within a heat reflecting surface. Ceramic-surfaced bricks can be used, for example.

Any combination of two or more of the above procedures will further increase the flame intensity.

It is desirable to have a flame of uniform intensity throughout. To this end, a multiplicity of small flames can be used rather than one large flame, since the intensity tends to be more uniform in smaller flames. Introducing the gas mixture into the flame, whether large or small, with high turbulence also tends to increase uniformity. The more uniform the flame, the more uniform the particle size distribution of the silica, that is, the smaller the difference between the largest and the smallest particles and the mean particle size. Naturally, the uniformity will depend to an appreciable extent upon the type of burner employed.

It should be pointed out that in the region from 5 to 50 m$\mu$ of the graph, representing the region of flame intensity within the invention, relatively large changes in the volume of oxygen-containing gas, silicon tetrafluoride and combustible gas proportions make only small changes in the particle size. However, in the region above $1.3\times10^{-5}$ B. t. u.$^{-1}$, i. e., the flames having a lower intensity than is required by the invention, relatively small differences in such proportions will produce large variations in particle size, and the particle size distribution will also be greater.

As the silicon fluoride, silicon tetrafluoride is preferably employed in the process of the invention. Compounds which generate the tetrafluoride in the vapor phase, such as hydrofluosilicic acid $H_2SiF_6$ and $Si_2F_6$, also can be used, and the silicon hydrofluorides, $HSiF_3$, $H_2SiF_2$ and $H_3SiF$, represent additional possibilities, although they are less readily available and much more expensive than the tetrafluoride.

The silicon tetrafluoride which is employed in the process of the invention can be generated by any of the various well-known procedures.

One method is well known and reported in the literature. Fluorite or fluorspar can be used as a source. This reacts with sulfuric acid solution and sand according to the following reaction:

$$2CaF_2+SiO_2+2H_2SO_4\rightarrow SiF_4+2CaSO_4+2H_2O$$

When 70% sulfuric acid solution is employed and the materials are mixed and heated, silicon tetrafluoride gas is liberated and this can be mixed with a combustible gas and an oxygen-containing gas as stated above.

In British Patent No. 438,782 another method is described involving the treatment of pulverized sand or silicates such as clay, waste glass, etc. with aqueous hydrofluoric acid, whereupon the silicon fluoride is evolved as a gas. This procedure makes possible the utilization of the reaction of the invention in a cyclic process, recycling the hydrogen fluoride liberated as a by-product of the desired silicon-forming reaction to react again with sand to form silicon tetrafluoride. In effect, the method in this case reduces sand to the amorphous overall particle size desired for use in rubber compounding.

See also Ephraim's Inorganic Chemistry, 4th edition, pp. 774–781 (1943), Nordeman Publishing Co.

In another procedure, useful in a cyclic process, an aqueous solution of hydrofluoric acid is passed into a chamber filled with silica, generating a solution of fluosilicic acid $((HF)_x \cdot SiF_4)$ where $x$ is less than 1, 1, 2 or more. This is vaporized and reacted as described. Hydrogen fluoride and silicon tetrafluoride in the effluent from the combustion reaction can be absorbed in water or in solid sodium fluoride to form a complex sodium hydrofluoride, or in aqueous fluorsulfonic acid solution, and others as disclosed in the literature, and concentrated if necessary, and then again utilized for manufacturing new amounts of fluosilicic acid.

In a cyclic process utilizing solid sodium fluoride, the following reactions take place:

Absorption at below about 300° C., say, 105° C.

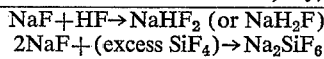

Desorption at about 325° C. or higher, say, 350° C.

The hydrogen fluoride thus obtained then is repeated and again reacted with silica, usually in an aqueous solution, to form silicon tetrafluoride.

A schematic outline of a cyclic process in accordance with this procedure is given in Figure 2.

As the combustible gas in the process of the invention there can be used any gas containing hydrogen, including hydrogen itself, or if hydrogen is supplied to the flame in some other form, for instance as fluosilicic acid, i. e., hydrogen fluoride and water vapor, other combustible gases which do not contain hydrogen such as carbon monoxide may be used. Volatile hydrocarbons and mixtures thereof are a convenient source of supply because they are plentiful and inexpensive, and among these there can be mentioned the aliphatic, alicyclic and aromatic hydrocarbons. Examples of combustible gases are producer gas, natural gas (mostly methane and ethane), commercial propane gas (a mixture of methane, ethane, propanes and butanes) commercial butane gas, benzene, water gas (a mixture of hydrogen and carbon monoxide), kerosene, methane, ethane, naphthenes, and gasoline, all in the vapor phase.

The nature of the combustible gas is not critical, although, as will be apparent, the amount of heat liberated in combustion of the gas is important. The ranges for flame intensity set forth were computed using hydrogen, carbon monoxide and a mixture of hydrocarbons as exemplary. If the combustible gas differs greatly from these materials in the amount of heat liberated in burning with oxygen, modifications may have to be made in the operating procedure suggested. It may, for example, be desirable to mix this material with a material liberating larger amounts of heat, so that the average will closely approximate that liberated in the burning of propane or hydrogen.

As an oxygen-containing gas in the above procedures, air can be used, as well as other mixtures of oxygen with inert gases, such as nitrogen and carbon dioxide, and even oxygen itself. Intensity of the flame is strongly increased if in place of air pure oxygen or an oxygen-enriched air is employed.

The apparatus which can be used in carrying out the generation of silicon tetrafluoride from sand is conventional in type. The silicon tetrafluoride generator can be an ordinary reactor equipped with a stirrer and external cooling. Into this is introduced a continuous stream of hydrofluoric acid and sand, the latter suitably containing at least 98% silicon dioxide. The solution in the reactor may contain an excess of dissolved silicon dioxide. The solution is conducted to a vaporizer where it is heated to eject the silicon tetrafluoride, together with some water vapor and some unreacted hydrogen fluoride. The mixture of silicon tetrafluoride and water vapor is conveyed through a pipe to the combustion chamber.

The apparatus which can be used in generating silicon tetrafluoride from fluorspar, sand and sulfuric acid is conventional in type. The silicon tetrafluoride generator can be an ordinary reactor equipped with a stirrer and external heating, and silicon tetrafluoride is liberated directly in the vapor phase.

The gases may be preheated by external heating and eventually mixed in order to obtain a sufficiently intense flame.

The combustion chamber can be a closed reaction chamber of metal lined with fireproof brick having ceramic or metallic reflecting surfaces to increase the heat in the flame zone. Into this chamber also is conducted an oxygen-containing gas, such as air, and the combustible gas, such as natural gas or hydrogen.

In order to obtain a sufficiently intense flame many different types of burners may be used, the essential factor being that the reacting gases very quickly are brought in intimate contact with each other, thus making possible a very intense reaction. Good results have been obtained with burners comprising a cylindrical mixing chamber in which silicon tetrafluoride, the combustible gas and air are mixed and the mixture passed through a screen or perforated plate with many fine apertures. The mixture is ignited outside the screen or plate, which prevents the flame from backfiring into the mixing chamber.

Another type of satisfactory burner is equipped with three concentric tubes, the oxygen-containing gas being supplied through the innermost and outermost tubes and the mixture of silicon tetrafluoride with a combustible gas and desirably a portion of the oxygen-containing gas is admitted through the intermediate tube. One large or a battery of small burner jets of this type can be used.

The hot exhaust gases from the burner with their content of silicon dioxide are conveyed to a dust separator, which may be for instance an electrostatic precipitator or a ceramic filter. In this area the temperature is suitably kept at about 200° C. to avoid condensation of hydrofluoric acid, because, as is well known, hydrofluoric acid is readily formed at temperatures below the dew point.

To recover the hydrogen fluoride the gases from the separator can be conducted to a conventional condenser and concentrated. The concentrated hydrofluoric acid thus obtained is returned for reuse in the treatment of fresh amounts of silica. The exhaust gases are discharged to the atmosphere. Or the hydrogen fluoride can be conducted to an absorption tower containing sodium fluoride, where it is absorbed at about 105° C., liberated later as desired by heating to 350° C. or above, and returned to form more silicon tetrafluoride.

The following examples illustrate several applications of the process of the invention.

EXAMPLES 1 TO 7

In these examples the silicon tetrafluoride was generated by heating a mixture of silica (sand) and calcium fluoride together with sulfuric acid. The silicon tetrafluoride so obtained was mixed with the combustible gas listed in the table below and with air or a 40% nitrogen 60% oxygen mixture and the mixture burned using a jet burner fitted with three concentric tubes. The mixture of silicon tetrafluoride, combustible gas, oxygen and inert gases was passed through the intermediate tube and air or (in Examples 4 and 7) 60% oxygen and 40% nitrogen mixture was passed through the outermost and innermost tubes. By varying the amount of oxygen and inert gases passed through the different tubes it was possible to vary the intensity of the flame as given in the table below. The mixture of hydrocarbons used in Examples 5–7 had the following composition: 3% $CH_4$, 11% $C_2H_6$, 51% $C_3H_8$ and 25% $C_4H_{10}$, giving a neat combustion heat of 2480 B. t. u. per cu. ft.

The silicon dioxide formed was separated from the combustion gases by means of a ceramic filter. The products obtained in all the examples were white, amorphous, voluminous powders which by examination under the electron microscope proved to be made up of amorphous, spherical particles having mean diameters ranging from 9 to 91 m$\mu$ of which a major proportion were associated as small aggregates.

Table I

| Ex. No. | Combustible gas | Amount of combustible gas, cu. ft./min. | Heat evolved in the flame, B.t.u./min. | Flame volume, cu. ft. | Flame intensity | | Particle size of silicon dioxide, m$\mu$ | Yield |
|---|---|---|---|---|---|---|---|---|
| | | | | | B. t. u./cu. ft. min. | B. t. u.$^{-1}$ | | |
| 1 | Hydrogen | 0.710 | 195 | 0.00513 | $3.80 \times 10^4$ | $2.63 \times 10^{-5}$ | 86 | 18 |
| 2 | ----do---- | 0.710 | 195 | 0.00259 | $7.70 \times 10^4$ | $1.30 \times 10^{-5}$ | 53 | 64 |
| 3 | ----do---- | 0.710 | 195 | 0.00110 | $17.7 \times 10^4$ | $0.57 \times 10^{-5}$ | 9 | 87 |
| 4 | ----do---- | 0.710 | 195 | 0.00025 | $78.0 \times 10^4$ | $0.13 \times 10^{-5}$ | 42 | 92 |
| 5 | Mixed hydrocarbons | 0.175 | 436 | 0.0111 | $3.92 \times 10^4$ | $2.55 \times 10^{-5}$ | 91 | 16 |
| 6 | ----do---- | 0.175 | 436 | 0.0058 | $7.51 \times 10^4$ | $1.33 \times 10^{-5}$ | 62 | 49 |
| 7 | ----do---- | 0.175 | 436 | 0.0029 | $15.0 \times 10^4$ | $0.67 \times 10^{-5}$ | 12 | 83 |

Example 1 shows that at a flame intensity less than that employed in the invention the mean particle size of the silica is 86 m$\mu$ and the yield is 18%. This is too large a particle size for a satisfactory reinforcing agent for rubber. When the flame intensity is increased to the lower limit of the invention (Example 2) the mean particle size is 53 m$\mu$, which is satisfactory, and the yield increases to 64%. A satisfactory particle size of 9 m$\mu$ is also obtained at $0.57 \times 10^{-5}$ B. t. u.$^{-1}$ (Example 3), and the yield is 87%. As the intensity increases however, the particle size again starts to rise, and at the upper limit of flame intensity reaches 32 m$\mu$ (Example 4), although the yield is still excellent (92%).

The results obtained when burning a mixture of hydrocarbons show that a similar condition exists in the case of this combustible gas. An unsatisfactory particle size is obtained at a flame intensity below that in the invention (Example 5) and the yield is only 19%. At $1.33 \times 10^{-5}$ B. t. u.$^{-1}$ (Example 6) the particle size approaches the upper limit of the invention and the yield is 49%. At $0.67 \times 10^{-5}$ B. t. u.$^{-1}$ (Example 7) the particle size is eminently satisfactory, and the yield is 83%.

Similar results are obtained using water gas, coal gas, natural gas and producer gas.

In addition to providing good control over the mean particle sizes of the silica produced by the reaction the process of the invention also produces a more uniform product, that is, the standard deviation (see for instance Dallavalle: Michrometritics, the Technology of Fine Particles, New York, 1948) proportion of particles approximating the means size, is smaller for samples obtained according to this invention than in samples obtained in ordinary flames. In fact it can be said that, in general, the standard deviation $\sigma$ is about 1 to 3, whereas in the case of the previously prepared products the standard deviation would be much greater.

The process of the invention also gives a higher yield of silica. In the range of $3 \times 10^{-5}$ to $5 \times 10^{-5}$ B. t. u.$^{-1}$, the yield is normally only 10 to 20%. However, in the optimum range of flame intensity in accordance with the invention, the yield ranges from about 50 to about 98%. The higher yields are obtained using the smaller amounts of the silicon tetrafluoride.

EXAMPLE 8

With simultaneous stirring and cooling hydrofluoric acid (38%) was reacted with an excess of sand (98% $SiO_2$). Of the solution thus obtained, 1 kg. per hour was introduced into a vaporizer where the solution was continuously vaporized. The vapors thus obtained were mixed with a continuous stream of 1.5 m.$^3$/hour carbon monoxide and 2.0 m.$^3$/hour air, which had each been separately preheated to about 300° C. The mixture of gases thus obtained was burned in a burner into which a further quantity of 2.1 m.$^3$/hour air of 300 C. was introduced with turbulence so that a flame intensity of $0.75 \times 10^{-5}$ B. t. u.$^{-1}$ was obtained. The silicon dioxide formed in the reaction was separated from the exhaust gases obtained by means of a bag-filter, after which the gases were cooled to 20° C. in a tower filled with Raschig rings. In the tower hydrofluoric acid (37%) was obtained with a yield of 88% of the amount of hydrofluoric acid used for the production of the fluosilicic acid.

The silicon dioxide obtained consisted of an exceedingly voluminous, amorphous white powder with an apparent volume weight of 0.05 kg./l., which on examination in an electron-microscope proved to consist of spherical particles with a mean diameter of 18 m$\mu$, and which were only in a slight degree agglomerated in the form of larger aggregates. The yield of silicon dioxide obtained was 86% of the stoichiometrically calculated yield.

EXAMPLE 9

A solution of fluosilicic acid was prepared in the same way as in the preceding example. Of the solution, 1 kg. was vaporized per hour. The vapors were mixed with 3.2 m.$^3$/hour generator gas containing 50% carbon monoxide and about 50% nitrogen. In addition to this, 0.75 m.$^3$ oxygenated air containing 50% oxygen was introduced into the mixture per hour. Both the carbon monoxide and the oxygenated air had been preheated to 300° C. before the mixing. Into the burner was introduced with intense turbulence a further quantity of 0.90 m.$^3$/hour oxygenated air containing 50% oxygen. The silicon dioxide accompanying the exhaust gases, as well as the hydrogen fluoride, was collected in the same way as in the preceding example. The hydrofluoric acid obtained had a content of 39% hydrogen fluoride, and the yield of hydrogen fluoride was 93% of the theoretical amount.

Also in this case the silicon dioxide consisted of a voluminous, amorphous white powder in the form of spherical particles with a mean diameter of 28 m$\mu$. The yield was 89% of the theoretically calculated amount.

When carbon monoxide is used as the combustible gas, the reaction is especially advantageous, in that no water is liberated:

$$SiF_4 + 2CO + O_2 + 2H_2O \rightarrow SiO_2 + 4HF + 2CO_2$$

Thus, a cyclic process is especially easy to carry out, since no water is collected when the hydrogen fluoride is recovered, and the concentration of an aqueous hydrofluoric acid solution is not necessary; hydrogen fluoride can be collected in aqueous solution and recycled directly for reuse to generate silicon tetrafluoride from silica (sand).

The finely-divided, amorphous silica prepared by the process of the invention is particularly adapted for use as a reinforcing agent in rubber compounding. However, it may also be employed for other purposes, such as a pigment, a filler for synthetic resins and a reinforcing agent for synthetic polymers, such as silicone resins, which are, basically, modified silicic oxide polymers.

The silica particles produced by the process are amorphous, that is, they are noncrystalline in character. They can be agglomerated to form larger particles if desired.

I claim:

1. A process of producing amorphous, finely-divided silica having a mean particle size within the range from about 5 to about 50 m$\mu$ which comprises reacting in the gas phase a silicon fluoride with a combustible gas and a free oxygen-containing gas in a flame zone liberating from 0.1 to 1.3×10$^{-5}$ B. t. u.$^{-1}$ to form silica and hydrogen fluoride.

2. A process in accordance with claim 1 in which the silicon fluoride and combustible gas are mixed with at least a part of the free oxygen-containing gas prior to the combustion.

3. A process in accordance with claim 1 in which the silicon fluoride is silicon tetrafluoride.

4. A process in accordance with claim 1 in which the combustible gas is a hydrocarbon.

5. A process in accordance with claim 1 in which the combustible gas is commercial propane.

6. A process in accordance with claim 1 in which the combustible gas is hydrogen.

7. A process in accordance with claim 1 in which the combustible gas is carbon monoxide.

8. A process in accordance with claim 1 in which the combutible gas is water gas.

9. A process in accordance with claim 1 in which a mixture of the silicon fluoride and the combustible gas is introduced together into the flame zone and the free oxygen-containing gas is mixed therewith with high turbulence.

10. A cyclic process in accordance with claim 1 in which the silicon fluoride is silicon tetrafluoride, and the latter is obtained by reaction of silica and aqueous hydrofluoric acid, and hydrogen fluoride liberated in the silica-forming reaction is recycled to form more silicon tetrafluoride.

11. A cyclic process in accordance with claim 10, in which the hydrogen fluoride liberated in the silica-forming reaction is absorbed in aqueous hydrofluoric acid solution.

12. A cyclic process in accordance with claim 10, in which the hydrogen fluoride liberated in the silica-forming reaction is absorbed by reaction with sodium fluoride to form a complex sodium hydrofluoride at a temperature below about 300° C. and liberated again as desired by heating the complex hydrofluoride at a temperature above about 325° C.

References Cited in the file of this patent

UNITED STATES PATENTS

| | | |
|---|---|---|
| 1,850,286 | Mittasch et al. | Mar. 22, 1932 |
| 2,399,687 | McNabb | May 7, 1946 |
| 2,535,036 | Broughton | Dec. 26, 1950 |
| 2,631,083 | Engleson et al. | Mar. 10, 1953 |
| 2,635,946 | Weber et al. | Apr. 21, 1953 |

FOREIGN PATENTS

| | | |
|---|---|---|
| 258,313 | Great Britain | Sept. 15, 1926 |
| 438,782 | Great Britain | Nov. 22, 1935 |

U. S. DEPARTMENT OF COMMERCE
PATENT OFFICE

CERTIFICATE OF CORRECTION

Patent No. 2,819,151 January 7, 1958

Gösta Lennart Flemmert

It is hereby certified that error appears in the printed specification of the above numbered patent requiring correction and that the said Letters Patent should read as corrected below.

Column 7, line 38, for "reaches 32" read -- reaches 42 --; column 9, line 31, for "combutible" read -- combustible --.

Signed and sealed this 11th day of March 1958.

(SEAL)
Attest:
KARL H. AXLINE
Attesting Officer

ROBERT C. WATSON
Commissioner of Patents